(12) United States Patent
Wiese et al.

(10) Patent No.: US 9,548,608 B2
(45) Date of Patent: Jan. 17, 2017

(54) GAS TUBE IMPULSE PROTECTION

(71) Applicant: Adtran Inc., Huntsville, AL (US)

(72) Inventors: James B. Wiese, Huntsville, AL (US); Timothy N. Ardley, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 156 days.

(21) Appl. No.: 14/224,299

(22) Filed: Mar. 25, 2014

(65) Prior Publication Data
US 2015/0280428 A1  Oct. 1, 2015

(51) Int. Cl.
| | |
|---|---|
| *H04M 1/00* | (2006.01) |
| *H04M 9/00* | (2006.01) |
| *H02H 9/04* | (2006.01) |
| *H01T 2/02* | (2006.01) |
| *H01T 4/12* | (2006.01) |
| *H02H 9/06* | (2006.01) |
| *H01R 24/64* | (2011.01) |

(52) U.S. Cl.
CPC ............... *H02H 9/041* (2013.01); *H01T 2/02* (2013.01); *H01T 4/12* (2013.01); *H02H 9/06* (2013.01); *H01R 24/64* (2013.01); *Y10T 29/49117* (2015.01)

(58) Field of Classification Search
CPC ...................................................... H02H 9/04
See application file for complete search history.

(56) References Cited

U.S. PATENT DOCUMENTS

| | | | | |
|---|---|---|---|---|
| 6,018,452 A | * | 1/2000 | Meyerhoefer | H01T 4/06 361/111 |
| 6,266,223 B1 | * | 7/2001 | Curry | H02H 9/042 361/119 |
| 6,327,129 B1 | * | 12/2001 | Oertel | H01T 1/14 361/117 |
| 6,954,347 B1 | * | 10/2005 | Chaudhry | H04M 3/18 361/119 |
| 7,116,779 B1 | * | 10/2006 | Meyerhoefer | H04L 12/10 379/399.01 |
| 2004/0028210 A1 | * | 2/2004 | Duncan | H04M 3/51 379/265.01 |
| 2004/0264087 A1 | * | 12/2004 | Bishop | H04M 1/745 361/91.1 |
| 2006/0262478 A1 | * | 11/2006 | Chaudhry | H04M 1/745 361/119 |

* cited by examiner

*Primary Examiner* — Joseph T Phan
(74) *Attorney, Agent, or Firm* — Fish & Richardson P.C.

(57) ABSTRACT

Methods, systems, and apparatus for protecting electrical components are disclosed. In one aspect a system includes a first gas discharge tube connected to a first conductor of a first twisted wire pair; and a second gas discharge tube connected to a second conductor of the first twisted wire pair. The first gas discharge tube can also be connected to a third conductor of a second twisted wire pair, and the second gas discharge tube can be connected to a fourth conductor of the second twisted wire pair.

13 Claims, 6 Drawing Sheets

GAS TUBE IMPULSE PROTECTION

BACKGROUND

This specification relates to electrical impulse suppression.

Electrical impulses, such as those caused by lightning, can damage electronic components. In the context of telecommunications equipment, the electrical impulses can be damage components connected to a power source and/or components that are connected to communications interfaces.

SUMMARY

In general, one innovative aspect of the subject matter described in this specification can be embodied in a protection circuit that includes a first gas discharge tube connected to a first conductor of a first twisted wire pair; and a second gas discharge tube connected to a second conductor of the first twisted wire pair. These and other embodiments can each optionally include one or more of the following features.

The first gas discharge tube can be connected to a third conductor of a second twisted wire pair. The second gas discharge tube can be connected to a fourth conductor of the second twisted wire pair.

The first conductor can be a positive conductor of the first twisted wire pair, and the third conductor can be a positive conductor of the second twisted wire pair. The second conductor can be a negative conductor of the first twisted wire pair, and the fourth conductor can be a negative conductor of the second twisted wire pair.

The first conductor can be connected to pin 3 of an RJ45 connector and the second conductor can be connected to pin 1 of the RJ45 connector. The third conductor can be connected to pin 2 of the RJ45 connector and the fourth conductor can be connected to pin 6 of the RJ45 connector.

The first conductor can be a tip conductor of the first twisted wire pair and the second conductor can be a ring conductor of the second twisted wire pair.

Another innovative aspect of the subject matter described in this specification can be embodied in a system including a first gas discharge tube; a second gas discharge tube; a first wire pair having a first conductor connected to the first gas discharge tube and a second conductor connected to the second gas discharge tube; and a second wire pair having a third conductor connected to the first gas discharge tube and a fourth conductor connected to the second gas discharge tube.

Another innovative aspect of the subject matter described in this specification can be embodied in a system including a first gas discharge tube; a second gas discharge tube; a first pair of conductors over which telecommunications signals are transmitted; and a second pair of conductors over which telecommunications signals are transmitted, wherein: the first gas discharge tube is connected to one conductor of the first pair and one conductor of the second pair; and the second gas discharge tube is connected to one conductor of the first pair and one conductor of the second pair.

Another innovative aspect of the subject matter described in this specification can be embodied in methods that include the actions of connecting a first terminal of a first gas discharge tube to a first conductor of a first twisted wire pair; and connecting a second terminal of the first gas discharge tube to a first conductor of a second twisted wire pair.

These and other embodiments can each optionally include one or more of the following features. Methods can include the action of connecting a first terminal of a second gas discharge tube to a second conductor of the first twisted wire pair. Methods can include the action of connecting a second terminal of the second gas discharge tube to a second conductor of the second twisted wire pair.

The first twisted wire pair and the second twisted wire pair can be Ethernet wire pairs. The first twisted wire pair can be connected to pin 1 and pin 2 of an RJ45 connector and the second twisted wire pair can be connected to pin 3 and pin 6 of the RJ45 connector.

Connecting the first terminal can include connecting the first terminal to a tip conductor of the first twisted wire pair. Connecting the second terminal can include connecting the second terminal to a tip conductor of the second twisted wire pair.

Connecting a first terminal can include connecting the first terminal of the first gas discharge tube to a tip conductor of the first twisted wire pair. Connecting a second terminal can include connecting the second terminal of the first gas discharge tube to a ring conductor of the second twisted wire pair.

Particular embodiments of the subject matter described in this specification can be implemented so as to realize one or more of the following advantages. Damage to electrical components can be prevented by suppressing electrical surges on pairs of conductors.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An electrical device can be damaged by voltage spikes that couple to conductors connected to the electrical device. For example, a voltage spike that is caused by a lightning strike can enter an electrical device through power source conductors and/or communication lines (e.g., an RJ45 cable) that are connected to the electrical device. As discussed in more detail below, a protection circuit can be connected to the conductors of the electrical device to protect the electrical device from transient voltages that may couple to the conductors. For example, as discussed in detail with respect to FIG. 1, a pair of gas discharge tubes can be connected to two conductor pairs to prevent transient voltages from damaging a communications network element.

Figure 1:
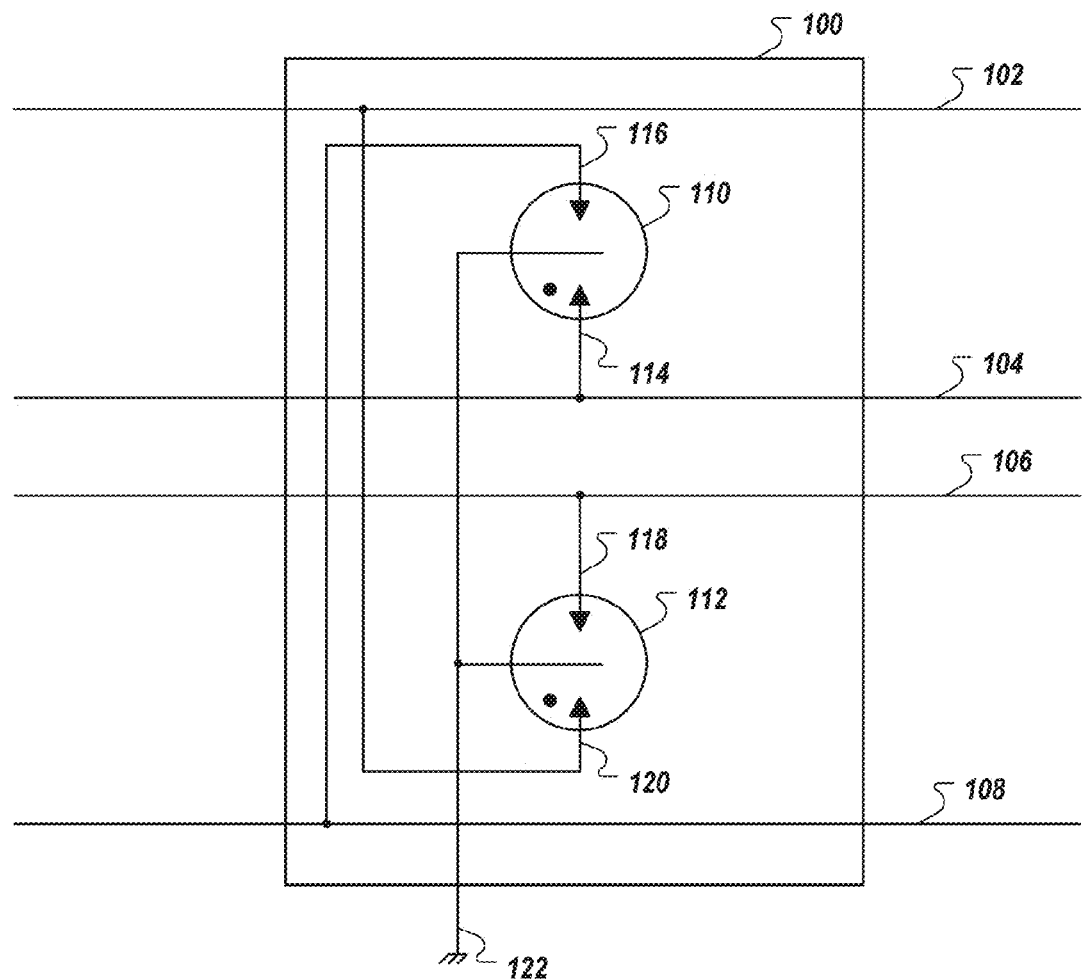
FIG. 1 is a schematic of an example protection circuit that is connected to two pairs of conductors

FIG. 1 is a schematic of an example protection circuit 100 that is connected to two pairs of conductors. A first pair of conductors includes a first conductor 102 and a second conductor 104. A second pair of conductors in FIG. 1 includes a third conductor 106 and a fourth conductor 108. Each of the wire pairs can be wire pairs over which differential telecommunications signals (e.g., complementary signals) are transmitted. For example, one conductor of each of the pairs can be considered a positive conductor over which a positive amplitude signal is transmitted, and the other conductor of each pair can be considered a negative conductor over which a negative amplitude signal is transmitted.

The protection circuit 100 includes two gas discharge tubes 110 and 112. The gas discharge tube 110 has one terminal 114 that is connected to the second conductor 104 of the first pair, and another terminal 116 that is connected to the fourth conductor 108 of the second pair. The gas discharge tube 112 has one terminal 118 that is connected to the third conductor 106 of the second pair, and another terminal 120 that is connected to the first conductor 102 of the first pair. Both of the gas discharge tubes 110 and 112 are connected to a grounded conductor 122.

The protection circuit 100 can be connected between any two pairs of conductors in any environment that uses two or more pairs of conductors. In some implementations, the two pairs of conductors can be pairs of conductors for a Ti communications system, and the protection circuit 100 can protect communications equipment that is connected to the Ti communications system pairs.

In some implementations, the first conductor 102 and the second conductor 104 can be a transmit pair, while the third conductor 106 and the fourth conductor 108 can be a receive pair. In this example, terminal 114 of the gas discharge tube 110 can be connected to one conductor of the transmit pair (e.g., 104) and terminal 116 can be connected to a conductor of the receive pair (e.g., 108). Similarly, in this example, terminal 118 of the gas discharge tube 112 can be connected to another conductor of the transmit pair (e.g., 102) and the terminal 120 can be connected to another conductor of the receive pair (e.g., 106).

In some implementations, the protection circuit 100 can be utilized in a tip/ring telecommunications environment. For example, the first conductor 102 of the transmit pair can be a tip conductor and the second conductor 104 of the transmit pair can be a ring conductor. Similarly, the third conductor 106 of the receive pair can be a tip conductor for the receive pair, while the fourth conductor 108 can be a tip conductor for the receive pair.

In this example, the gas discharge tube 110 is connected to two ring conductors from two different pairs of conductors, and the gas discharge tube 112 is connected to two tip conductors from two different pairs of conductors. As illustrated by additional examples below, the protection circuit 100, or other protection circuit configurations, can also protect devices that are connected to pairs of conductors in other types of communications systems. Throughout this document some of the example protection circuits (e.g., protection circuit 100) are illustrated having two gas discharge tubes that are located inside a rectangle. This illustration is for purposes of example only. Protection circuits similar to those described can include additional gas discharge tubes, and the gas discharge tubes are not required to be in a same housing.

Figure 2:
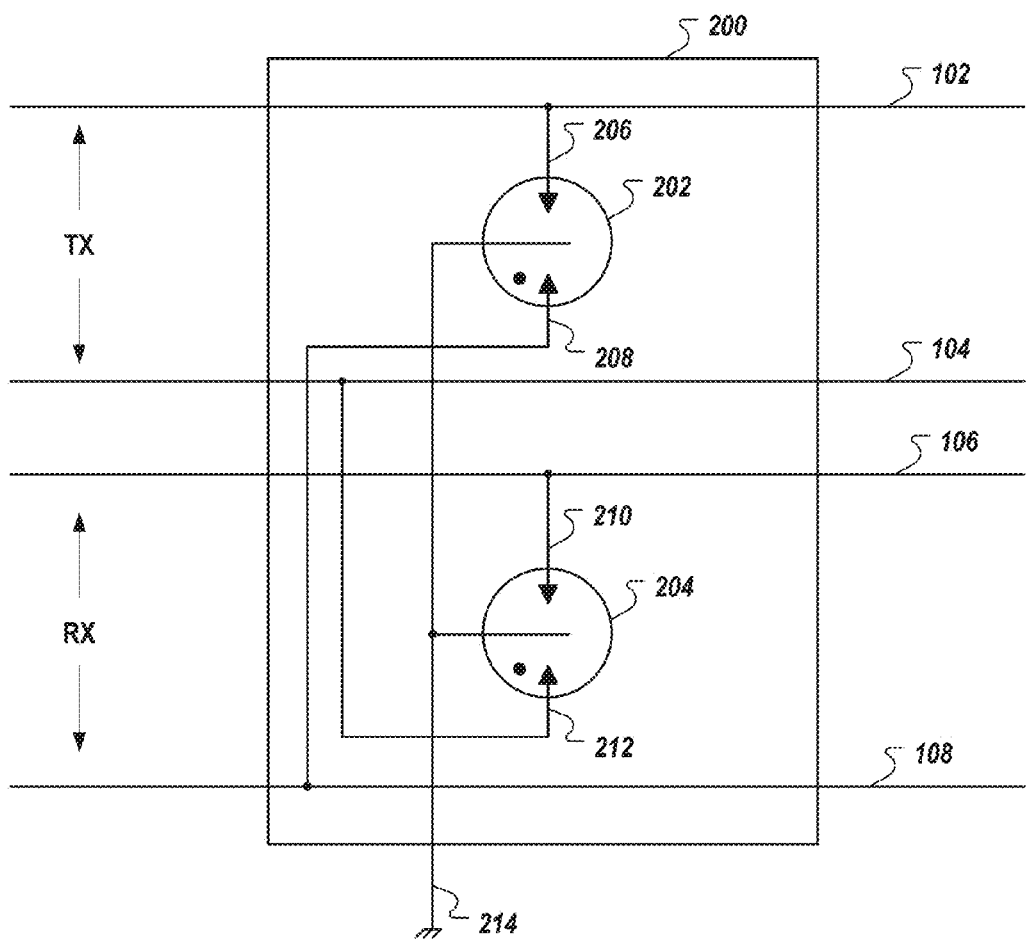
FIG. 2 is a schematic of another example protection circuit that is connected to two wire pairs.

FIG. 2 is a schematic of another example protection circuit 200 that is connected to the two wire pairs discussed above with respect to FIG. 1. In FIG. 2, the wire pairs have been labeled ("TX") and ("RX") to show that one of the wire pairs can be a transmit wire pair and the other wire pair can be a receive wire pair. This notation is provided solely for purposes of example, and not intended to limit the use of the protection circuit to a transmit/receive pair environment.

The protection circuit 200 is similar to that described above with respect to FIG. 1, for example, because the protection circuit 200 includes two gas discharge tubes 202 and 204 that are connected to the two wire pairs 102 and 104. The protection circuit 200 differs from that in FIG. 1, for example, because the gas discharge tube 202 is connected between the first conductor 102 and the fourth conductor 108, while the gas discharge tube 204 is connected between the second conductor 104 and the third conductor 106. In contrast, the gas discharge tube 110 of FIG. 1 is connected between the second conductor 104 and the fourth conductor 108, while the gas discharge tube 112 is connected between the first conductor 102 and the third conductor 106. Both of the gas discharge tubes 202 and 204 are connected to a grounded conductor 214.

In some implementations, the transmit pair and the receive pair can be implemented in a tip/ring telecommunications environment. In the tip/ring environment, the gas discharge tube 202 can be connected between a tip conductor of the transmit pair and a ring conductor of the receive pair, and the gas discharge tube 204 can be connected between a tip conductor of the receive pair and a ring conductor of the transmit pair. For example, the gas discharge tube 202 can have the terminal 206 connected to a tip conductor of the transmit pair ("TX"), and another terminal 208 that is connected to a ring conductor of the receive pair ("RX"). Similarly, the gas discharge tube 204 can have one terminal 210 connected to a tip conductor of the receive pair ("RX"), and have another terminal 212 connected to a ring conductor of the transmit pair ("TX"). In this example, each of the gas discharge tubes is connected to a tip conductor from one of the pairs (e.g., TX or RX) and a ring conductor from the other pair (e.g., RX or TX).

As shown by the differences between FIG. 1 and FIG. 2, a protection circuit can be implemented by various configurations that result in each of the gas discharge tubes having one terminal connected to one conductor of a particular pair of conductors, and another terminal connected to a conductor from a different pair of conductors. For example, a protection circuit can be implemented by connecting each gas discharge tube between conductors of different pairs of conductors (e.g., twisted cable pairs).

Figure 3:
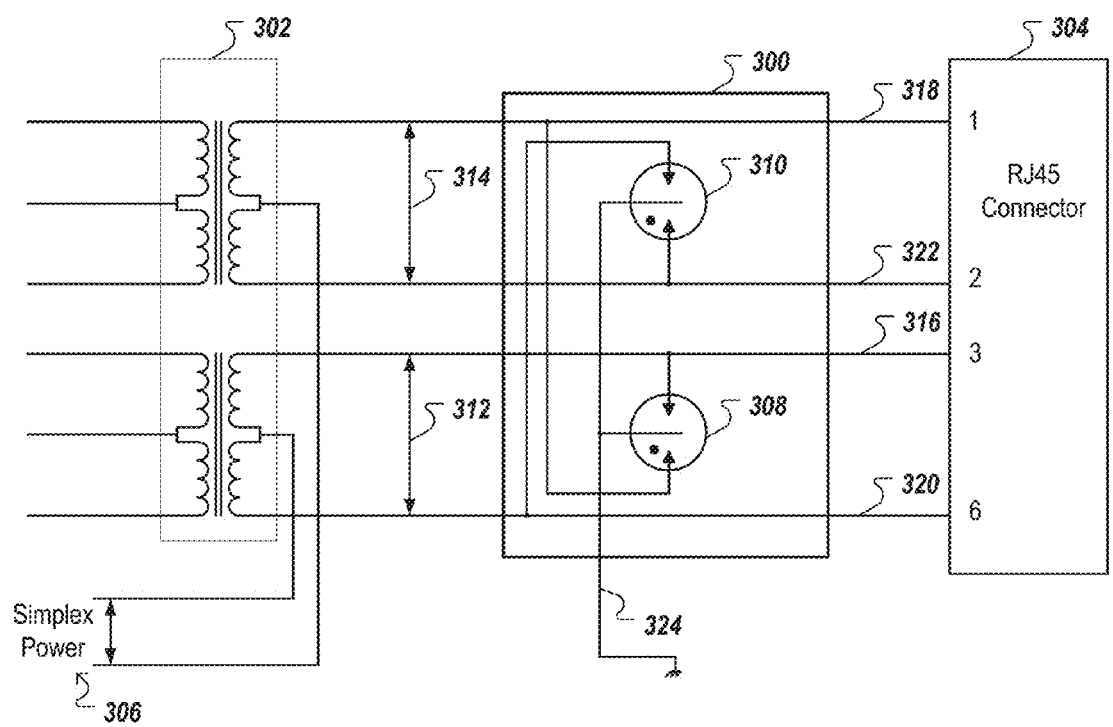
FIG. 3 is a schematic of an example communications system that includes an example protection circuit.

FIG. 3 is a schematic of an example communications system 300 that includes a protection circuit 300. The example protection circuit 300 can protect, for example, devices connected to a 10/100 BaseT Ethernet communications line that provides Power Over Ethernet ("POE"). As illustrated by FIG. 3, the protection circuit 300 is connected between a transformer stage 302 and an RJ45 connector 304. The transformer stage 302 provides a simplex power output 306 that can power a communications device (e.g., the network element 108 of FIG. 1).

The protection circuit 300 is similar to that discussed above with respect to FIG. 1. For example, the protection circuit 300 includes two gas discharge tubes 308 and 310 that are interconnected between two different pairs of conductors 312 and 314. For example, the gas discharge tube 308 is connected to one conductor 316 from the pair of conductors 312 and one conductor 318 from the pair of conductors 314. Similarly, the gas discharge tube 310 is connected to the other conductor 320 (i.e., the conductor that is not connected to the gas discharge tube 310) from the pair of conductors 312 and the other conductor 322 from the pair of conductors 314. Both of the gas discharge tubes 308 and 310 are connected to a grounded conductor 324.

As illustrated by FIG. 3, the conductor 318 is connected to pin 1 of the RJ45 connector, and the conductor 316 is connected to pin 3 of the RJ45 connector. Thus, the gas discharge tube is connected to pin 1 and pin 3 of the RJ45 connector. The conductor 322 is connected to pin 2 of the RJ45 connector and the conductor 320 is connected to pin 6 of the RJ45 connector. Thus, the gas discharge tube is connected to pin 2 and pin 6 of the RJ45 connector.

Figure 4:
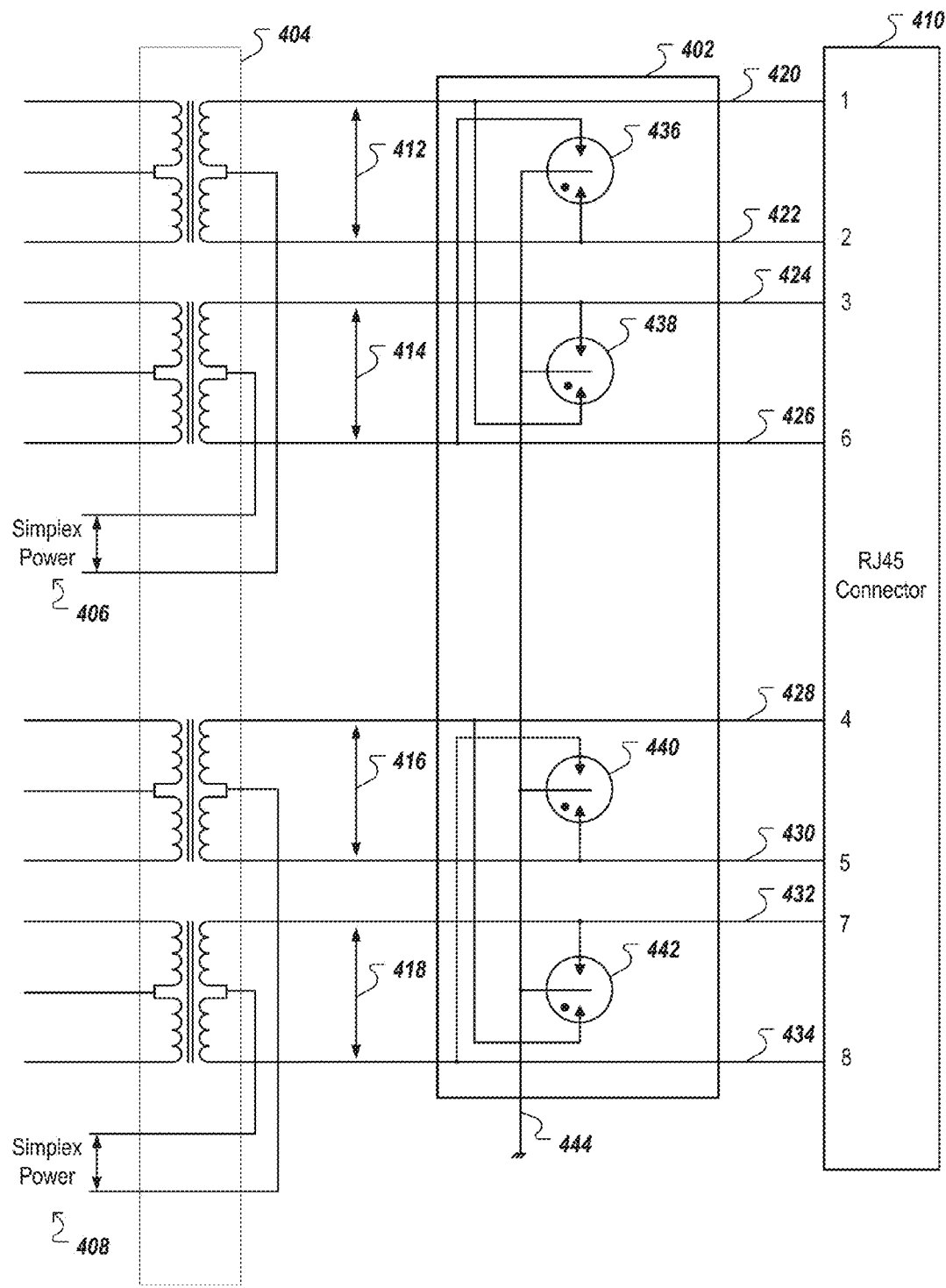
FIG. 4 is a schematic of another example communications system that includes an example protection circuit.

FIG. 4 is a schematic of another example communications system 400 that includes a protection circuit 402. The system 400 can be, for example, a gigabit Ethernet communications system that provides POE. Similar to the system 300, the system 400 includes a transformer stage 404 that provides simplex power outputs 406 and 408. The system 400 also includes an RJ45 connector 410.

The system 400 includes four pairs of conductors 412, 414, 416, and 418 over which telecommunications signals can be transmitted. Each of the pairs 412, 414, 416, and 418 can be, for example, twisted wire pairs, such as those used in telecommunications environments. As illustrated by FIG. 4, the pair 412 includes a conductor 420 that is connected to pin 1 of the RJ45 connector, and another conductor 422 that is connected to pin 2 of the RJ45 connector. The pair 414 includes a conductor 424 that is connected to pin 3 of the RJ45 connector 410, and another conductor 426 that is connected to pin 6 of the RJ45 connector 410. The pair 416 includes a conductor 428 that is connected to pin 4 of the RJ5 connector 410, and another conductor 430 that is connected to pin 5 of the RJ45 connector 410. The pair 418 includes a conductor 432 that is connected to pin 7 of the RJ45 connector 410 and another conductor 434 that is connected to pin 8 of the RJ45 connector 410.

The protection circuit 402 includes four gas discharge tubes 436, 438, 440, and 442. The gas discharge tube 436 is connected to the conductor 422 of the pair 412 and the conductor 426 of the pair 414. The gas discharge tube 438 is connected to the conductor 420 of the pair 412 and the conductor 424 of the pair 414. Thus, the gas discharge tube 436 is connected between pins 2 and 6 of the RJ45 connector 410, and the gas discharge tube 438 is connected between pins 1 and 3 of the RJ45 connector 410.

The gas discharge tube 440 is connected to the conductor 430 of the pair 416 and the conductor 434 of the pair 418. The gas discharge tube 442 is connected to the conductor 428 of the pair 416 and to the conductor 432 of the pair 418. Thus, the gas discharge tube 440 is connected between pins 5 and 8 of the RJ45 connector 410, and the gas discharge tube 442 is connected between pins 4 and 7 of the RJ45 connector 410. All four of the gas discharge tubes 436, 438, 440, and 442 are connected to a grounded conductor 444.

Figure 5:
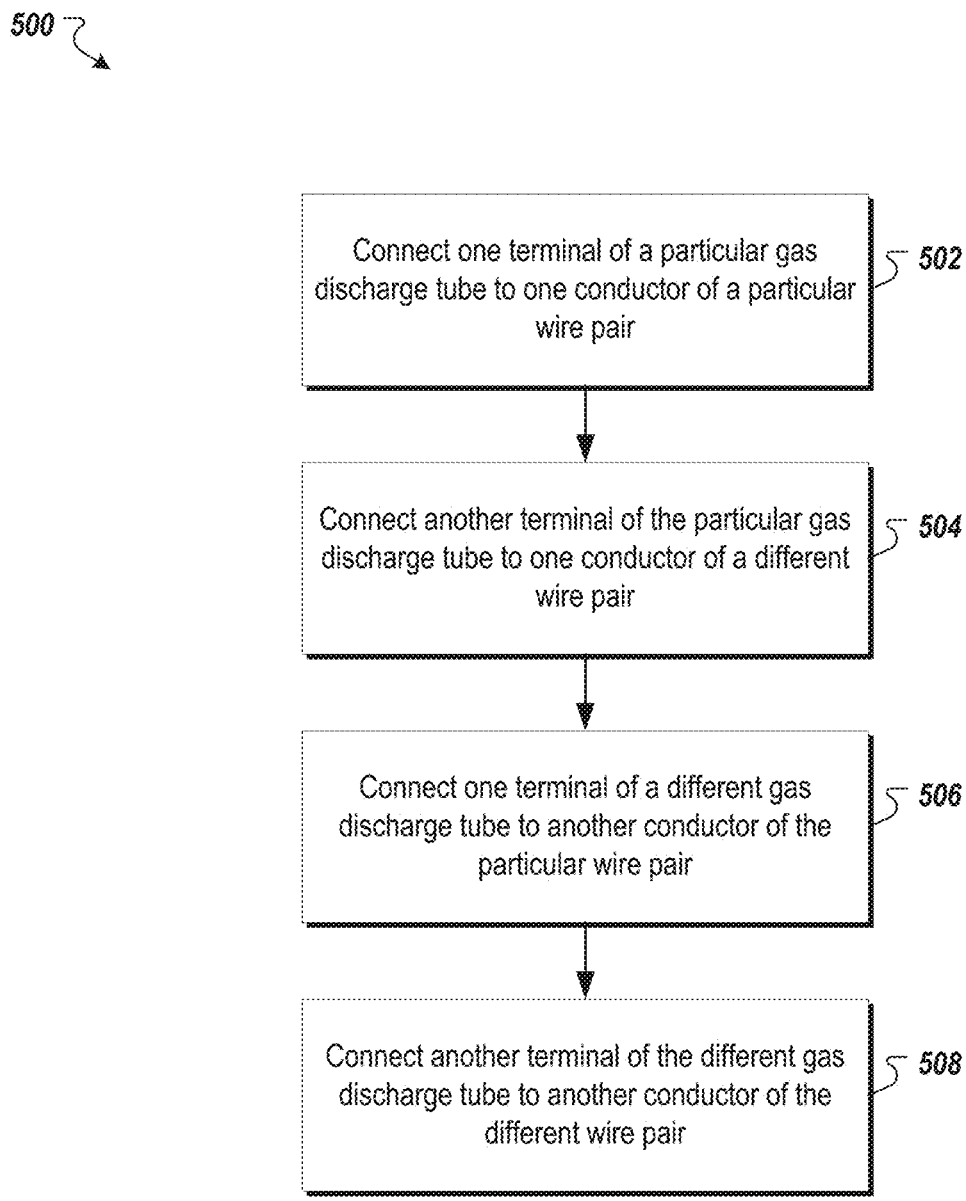
FIG. 5 is a flow chart of an example process for creating a protection circuit.

FIG. 5 is a flow chart of an example process 500 for creating a protection circuit. For purposes of example, the process 500 is described with reference to FIG. 1. FIGS. 2-4 show other examples of protection circuits that can be created using the process 500.

According to the process 500, one terminal of a particular gas discharge tube is connected to one conductor of a particular wire pair (502). For example, as illustrated above with respect to FIG. 1, the terminal 114 of the gas discharge tube 110 can be connected to the second conductor 104 (e.g., a ring conductor in a tip/ring environment) of the transmit pair. In some implementations, the one conductor is a conductor from a twisted wire pair. For example, the transmit pair can be a twisted wire pair of an Ethernet communications system.

Another terminal of the particular gas discharge tube is connected to one conductor of a different wire pair (504). For example, the gas discharge tube 110 can also be connected to the fourth conductor 108 (e.g., another ring conductor in a tip/ring environment) of the receive pair by terminal 116. In some implementations, the one conductor of the different wire pair is a conductor from a different twisted wire pair. For example, the receive pair can be another twisted wire pair of an Ethernet communications system.

One terminal of a different gas discharge tube is connected to another conductor of the particular wire pair (506). For example, the terminal 120 of the gas discharge tube 112 can be connected to the first conductor 102 (e.g., a tip conductor in a tip/ring environment) of the transmit pair.

Another terminal of the different gas discharge tube is connected to another conductor of the different wire pair (508). For example, the gas discharge tube 112 can be connected to the third conductor 106 (e.g., another tip conductor in a tip/ring environment) of the receive pair by the terminal 118.

Figure 6:
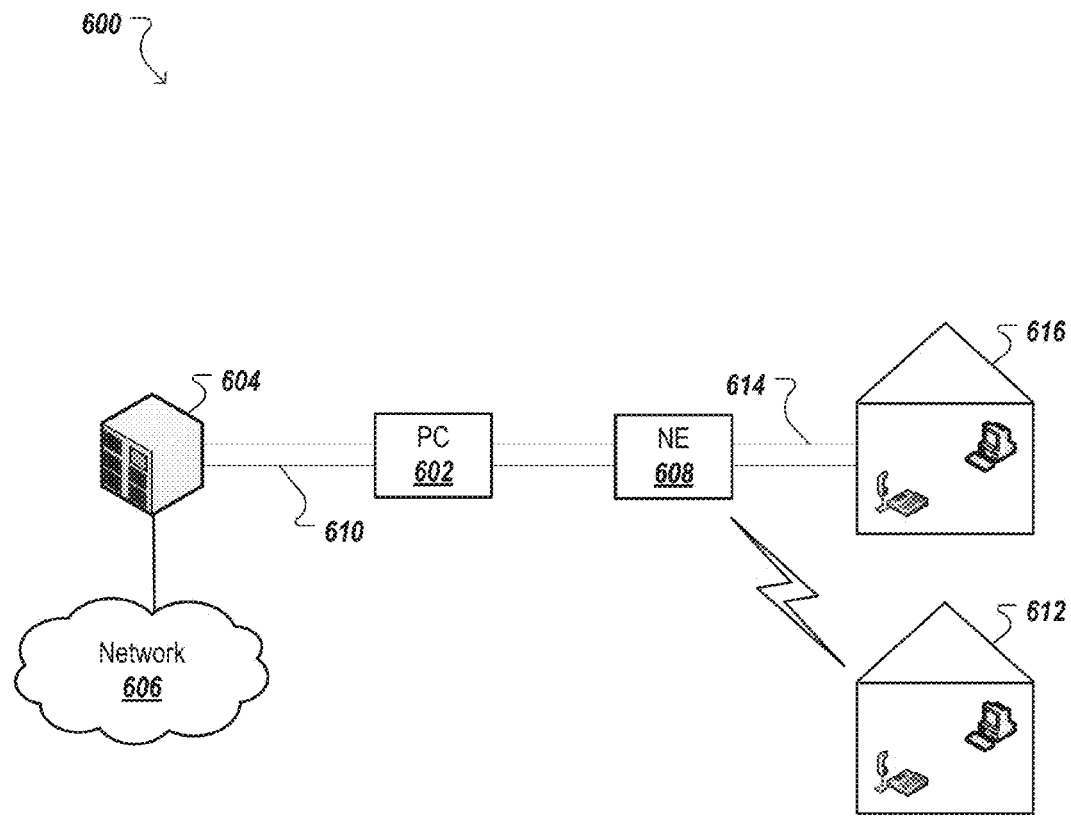
FIG. 6 is a block diagram of an example environment in which a protection circuit can be used.

FIG. 6 is a block diagram of an example environment 600 in which a protection circuit ("PC") 602 can be used. The environment 600 includes a router 604 (or another communication device) that is connected to a network 606, such as a wide area network or the Internet. The router 604 communicates with a network element ("NE") 608 over a transmission path 610. The network element 608 can be, for example, a wireless access point that communicates wirelessly with communications devices at an end user location 612 (e.g., business or residence). The network element 608 can also communicate over a wire line path 614 with communications devices located at another end user location 616.

The transmission path 610 can include, for example, twisted pair cables, such as twisted pair cables having RJ45 connectors that connect the twisted pair cables to the router 604, protection circuit 602, and/or network element 608. As illustrated by FIG. 6, the protection circuit 602 is connected to the transmission path 610 at a location that is between the router 604 and the network element 608. The protection circuit 602 is shown as an independent element in FIG. 6, but can be integrated into the network element 608.

The protection circuit 602 can be one of the protection circuits discussed above. The protection circuit 602 is configured to prevent transient voltages from damaging the network element 608. For example, the protection circuit can include two or more gas discharge tubes that are connected between two or more pairs of conductors (e.g., between two or more pairs of twisted pair cables). When a transient voltage of sufficient magnitude (e.g., a transient voltage that meets or exceeds a sparkover voltage of the gas discharge tubes) couples to the transmission path 610, the transient voltage will cause the gas discharge tubes to enter an arc mode (e.g., switch into a virtual short circuit). In the arc mode, the gas discharge tubes divert the transient voltage away from the network element 608 (e.g., either to ground or a source). When the magnitude of the transient voltage falls below a specified level (e.g., below an extinguishing voltage of the gas discharge tube), the gas discharge tubes will exit the arc mode.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A protection circuit, comprising:
a first gas discharge tube having a first terminal connected to a first conductor of a first twisted wire pair; and
a second gas discharge tube having a first terminal connected to a second conductor of the first twisted wire pair, wherein the first conductor is a tip conductor of the first twisted wire pair and the second conductor is a ring conductor of the first twisted wire pair, and each of the first gas discharge tube and the second gas discharge tube also have other terminals connected to a second different twisted wire pair.

2. The protection circuit of claim 1, wherein:
a second terminal of the first gas discharge tube is connected to a third conductor of a second twisted wire pair; and
a second terminal of the second gas discharge tube is connected to a fourth conductor of the second twisted wire pair.

3. The protection circuit of claim 2, wherein the first conductor is a positive conductor of the first twisted wire pair, and the third conductor is a positive conductor of the second twisted wire pair.

4. The protection circuit of claim 2, wherein the second conductor is a negative conductor of the first twisted wire pair, and the fourth conductor is a negative conductor of the second twisted wire pair.

5. The protection circuit of claim 2, wherein the first conductor is connected to pin 3 of an RJ45 connector and the second conductor is connected to pin 1 of the RJ45 connector.

6. The protection circuit of claim 5, wherein the third conductor is connected to pin 2 of the RJ45 connector and the fourth conductor is connected to pin 6 of the RJ45 connector.

7. A method, comprising:
connecting a first terminal of a first gas discharge tube to a first conductor of a first twisted wire pair; and
connecting a second terminal of the first gas discharge tube to a first conductor of a second different twisted wire pair, wherein:
connecting a first terminal comprises connecting the first terminal of the first gas discharge tube to a tip conductor of the first twisted wire pair; and
connecting a second terminal comprises connecting the second terminal of the first gas discharge tube to a ring conductor of the second twisted wire pair.

8. The method of claim 7, further comprising connecting a first terminal of a second gas discharge tube to a second conductor of the first twisted wire pair.

9. The method of claim 8, further comprising connecting a second terminal of the second gas discharge tube to a second conductor of the second twisted wire pair.

10. The method of claim 7, wherein the first twisted wire pair and the second twisted wire pair are Ethernet wire pairs.

11. The method of claim 7, wherein the first twisted wire pair is connected to pin 1 and pin 2 of an RJ45 connector and the second twisted wire pair is connected to pin 3 and pin 6 of the RJ45 connector.

12. The method of claim 7, wherein connecting the first terminal comprises connecting the first terminal to a tip conductor of the first twisted wire pair.

13. The method of claim 12, wherein connecting the second terminal comprises connecting the second terminal to a tip conductor of the second twisted wire pair.

* * * * *